US005881164A

United States Patent [19]
Ichikawa

[11] Patent Number: 5,881,164
[45] Date of Patent: Mar. 9, 1999

[54] IMAGE DATA PROCESSING METHOD AND IMAGE DATA PROCESSING APPARATUS

[75] Inventor: Masayoshi Ichikawa, Tokyo, Japan

[73] Assignee: Advantest Corporation, Tokyo, Japan

[21] Appl. No.: 870,682

[22] Filed: Jun. 6, 1997

[30]     Foreign Application Priority Data

Jun. 7, 1996   [JP]   Japan ............................... 145578/1996

[51] Int. Cl.$^6$ .............................. G06K 9/46; G06K 9/54; G06T 5/00
[52] U.S. Cl. .......................... 382/149; 382/190; 382/263; 382/266; 349/187
[58] Field of Search ................................... 382/141, 149, 382/260, 263, 266, 269, 274, 254, 190, 195, 199; 345/904; 349/129, 192, 187

[56]                References Cited

U.S. PATENT DOCUMENTS

| | | | |
|---|---|---|---|
| 5,081,687 | 1/1992 | Henley et al. ........................... | 382/141 |
| 5,339,093 | 8/1994 | Kumagai et al. ....................... | 345/904 |
| 5,394,481 | 2/1995 | Kumagai et al. ....................... | 382/141 |
| 5,754,678 | 5/1998 | Hawthorne et al. .................... | 382/149 |

*Primary Examiner*—Scott Rogers
*Attorney, Agent, or Firm*—Knobbe, Martens, Olson & Bear, LLP

[57]                ABSTRACT

An image data processing method by which stripped brightness non-uniformities of a very low contrast can be detected accurately from an input multiple-valued digital image data. The method includes (1) the first step of producing a first emphasis image data from the input image data by first line segment emphasis filtering processing for emphasis of line segments at least of a predetermined direction and producing a binary image data from the first emphasis image data by first threshold value processing, and (2) the second step of producing a second emphasis image data from the binary image data by second line segment emphasis filtering processing for emphasis of line segments of the predetermined direction and extracting the line segments of the predetermined direction from the second emphasis image data by second threshold value processing. Through the method, the line segments of the predetermined direction arranged in a juxtaposed relationship from each other are selectively detected. The method can be applied to, for example, detecting rubbing stripes of an LCD (liquid crystal display) panel.

12 Claims, 5 Drawing Sheets

| 1 | 1 | 1 | −2 | −2 | −2 | 1 | 1 | 1 |
|---|---|---|----|----|----|---|---|---|
| 1 | 1 | 1 | −2 | −2 | −2 | 1 | 1 | 1 |
| 1 | 1 | 1 | −2 | −2 | −2 | 1 | 1 | 1 |
| −2 | −2 | −2 | 4 | 4 | 4 | −2 | −2 | −2 |
| −2 | −2 | −2 | 4 | 5 | 4 | −2 | −2 | −2 |
| −2 | −2 | −2 | 4 | 4 | 4 | −2 | −2 | −2 |
| 1 | 1 | 1 | −2 | −2 | −2 | 1 | 1 | 1 |
| 1 | 1 | 1 | −2 | −2 | −2 | 1 | 1 | 1 |
| 1 | 1 | 1 | −2 | −2 | −2 | 1 | 1 | 1 |

FIG. 3

FIG. 4A
ORIGNAL IMAGE DATA (LINE)

FIG. 4B
LAPLACEAN IMAGE DATA

FIG. 4C
(ORIGNAL IMAGE DATA)
− (LAPLACEAN IMAGE DATA)

| 0  | −1 | 0  |
|----|----|----|
| −1 | 5  | −1 |
| 0  | −1 | 0  |

FIG. 5A

| −1 | −1 | −1 |
|----|----|----|
| −1 | 9  | −1 |
| −1 | −1 | −1 |

FIG. 5B

| 1  | −2 | 1  |
|----|----|----|
| −2 | 5  | −2 |
| 1  | −2 | 1  |

FIG. 5C

| 0 | 0 | 0 | 0 | 1 |
|---|---|---|---|---|
| 0 | 0 | 0 | 1 | 0 |
| 0 | 0 | 1 | 0 | 0 |
| 0 | 1 | 0 | 0 | 0 |
| 1 | 0 | 0 | 0 | 0 |

| 1 | 0 | 0 | 0 | 0 |
|---|---|---|---|---|
| 0 | 1 | 0 | 0 | 0 |
| 0 | 0 | 1 | 0 | 0 |
| 0 | 0 | 0 | 1 | 0 |
| 0 | 0 | 0 | 0 | 1 |

FIG. 8

IMAGE DATA PROCESSING METHOD AND IMAGE DATA PROCESSING APPARATUS

BACKGROUND OF THE INVENTION

1. Field of the Invention

This invention relates to an image data processing method and apparatus, and more particularly to an image data processing method and apparatus wherein non-uniformities of the brightness or the like which arise from some defect of an alignment film of an LCD (Liquid Crystal Display) panel can be detected with a high degree of accuracy.

2. Description of the Related Art

For example, in an inspection process in production of an LCD panel and so forth, it is required to detect non-uniformities of the brightness included in an image data with a high degree of accuracy.

While an LCD panel is produced applying a semiconductor device manufacturing technology such as a manufacturing technique for an integrated circuit (IC), various defects are caused by some non-conformities in the manufacturing process. Because of those defects, when an entirely uniformly white picture is displayed on the LCD panel, the displayed picture suffers from non-uniformities of the brightness (called "brightness non-uniformities" or "area defects"). The brightness non-uniformities include a brightness non-uniformity which is brighter than the surroundings and another brightness non-uniformity which is darker than the surroundings. Those brightness non-uniformities are roughly classified as white detect and black defect, respectively.

An LCD panel includes a liquid crystal layer enclosed between a pair of transparent substrates for which glass substrates or some other suitable substrates are used. In the LCD panel, orientation must be provided to liquid crystal molecules in the liquid crystal layer. To this end, an alignment film is formed on each of the glass substrates such that it contacts with the liquid crystal layer, and in a manufacturing process of the LCD panel, the alignment films are rubbed in a fixed direction using cloth or some other suitable article. The processing of rubbing alignment films in a fixed direction is called rubbing treatment. By performing the rubbing treatment, molecules of the liquid crystal enclosed between the two glass substrates are arranged with longitudinal axes thereof directed in the direction in which the alignment films are rubbed. While an LCD panel is generally formed as a rectangular plate-like member, the direction in which the alignment films are rubbed in the rubbing treatment is set to an oblique direction to a side of the rectangle, for example, in a direction of 45 degrees with respect to a side.

Since an LCD panel exhibits a non-uniform transmission amount of light if the arrangement of liquid crystal molecules is non-uniform, the rubbing treatment is a very important step in production of an LCD panel. However, the alignment films are sometimes rubbed non-uniformly in a striped pattern by some cause. As a result, when an entirely uniformly white picture is displayed on the LCD panel produced, striped non-uniformities of the brightness are produced on the displayed picture. Those brightness non-uniformities may be called "rubbing stripes".

After an LCD panel is manufactured, a picture quality inspection for evaluating such various brightness non-uniformities as described above is essentially required. Conventionally, a test picture is displayed on the LCD panel, and the screen of it is visually observed by an inspector to inspect the picture quality. However, the visual inspection is disadvantageous in that an inspection criterion is indefinite and a dispersion in inspection result is caused by a difference between individual inspectors or by fatigue of the inspector. Therefore, in order to automate the visual inspection, a picture quality inspection apparatus which performs a picture quality inspection based on a digital image data processing technique has been developed. Thanks to development of the image data processing technique, a picture quality inspection apparatus of the type mentioned can even detect brightness non-uniformities which are low in contrast in brightness.

In the picture quality inspection apparatus, an LCD panel on which a test picture is displayed is imaged using a CCD (Charge Coupled Device) image sensor of a high resolution, and various kinds of image data processing are performed using a multiple-valued digital image data obtained by the imaging as an original image data to detect brightness non-uniformities. Even brightness non-uniformities whose contrast in brightness is approximately 3 to 7% can be detected by utilization of filtering for noise removal or contrast emphasis and threshold value processing. An outline of such detection processing of brightness non-uniformities proposed already in Japanese Patent Application No. Heisei 8-28138 by the present inventor is described below. Here, an original image data is a multiple-valued digital image data which is an object of a series of image data processing.

The original image data obtained from an LCD panel includes shading of the brightness arising from a visibility angle characteristic of liquid crystal or some other cause, and the amount of variation of the shading of the brightness is generally larger than the contrast of brightness non-uniformities. Therefore, the shading of the brightness is first removed from the original image data. A mean value filter or a median filter is applied to the original image data to produce a smoothed image data, and the smoothed image data is subtracted from the original image data to remove the shading of the brightness. Here, the smoothed image data is called a shading image data, and the image data from which the shading has been removed is called a difference image data. The difference image data includes, in addition to the brightness non-uniformities, noises including spike-like noises which were intermixed upon imaging and shading components which remain without having been removed. Therefore, the brightness non-uniformities are detected using threshold value processing after a filter for removing the spike-like noises and processing for emphasizing the contrast of the brightness non-uniformities are performed for the difference image data.

A multiple-valued digital image is a two-dimensional array of a plurality of pixels and holds, for each pixel, a value of the pixel as a digital value. Here, each pixel value is an amount corresponding to the brightness of the pixel in a picture having a single color component or a black-and-white picture. The pixel value is represented, for example, by a digital value of 8 bits so that it represents one of 256 gradations. Further, addition or subtraction between two image data signifies to perform addition or subtraction between pixel values of corresponding pixels of the two image data repetitively for the individual pixels to obtain a new image data. Meanwhile, filtering processing is processing of calculating, for each pixel, a sum of pixel values of a plurality of pixels in the proximity of the objective pixel in an inputted image data to determine pixel values of an output image data, and contents of weighting to the pixels in the proximity are different depending upon the contents of the filtering. The weighting coefficients to the pixels in the proximity are normally represented as filter coefficients in the form of a matrix.

However, rubbing stripes are brightness non-uniformities of a very low contrast which are produced from a very small difference in force applied upon rubbing of the alignment films, and according to an experiment, the contrast is approximately 2 to 3%. Therefore, even if the picture inspection apparatus described above is used, it is not easy to detect rubbing stripes. Since the contrast of rubbing stripes is substantially equal to that of noises, if the threshold value is set comparatively low, then also noises are detected, and consequently, it is impossible to selectively detect only the rubbing stripes.

SUMMARY OF THE INVENTION

It is an object of the present invention to provide an image data processing method and an image data processing apparatus by which striped brightness non-uniformities of a very low contrast can be detected accurately.

It is another object of the present invention to provide an image data processing method and an image data processing apparatus for use for inspection of an LCD panel by which rubbing stripes can be detected selectively.

According to the present invention, an image data processing method for performing image data processing for an input image data is characterized in that it comprises a first step of producing a first emphasis image data from the input image data by first line segment emphasis filtering processing for emphasis of line segments at least of a predetermined direction and producing a binary image data from the first emphasis image data by first threshold value processing, and a second step of producing a second emphasis image data from the binary image data by second line segment emphasis filtering processing for emphasis of line segments of the predetermined direction and extracting the line segments of the predetermined direction from the second emphasis image data by second threshold value processing, whereby the line segments of the predetermined direction arranged in a juxtaposed relationship from each other are selectively detected.

In the image data processing method of the present invention, the input image data typically is a difference image data between an inputted original image data and a shading image data produced by filtering from the original image data.

According to the present invention, an image data processing apparatus for performing image data processing for an inputted original image data comprises an original image memory for holding the original image data, a shading filter for performing filtering for the original image data to produce a shading image data, a subtractor for producing a difference image data between the original image data and the shading image data, a first line segment emphasis filter for performing filtering for emphasis of line segments at least of a predetermined direction for the difference image data to produce a first emphasis image data, first threshold value processing means for performing threshold value processing for the first emphasis image data to produce a binary image data, a second line segment emphasis filter for performing filtering processing for emphasis of line segments of the predetermined direction for the binary image data to produce a second emphasis image data, and second threshold value processing means for performing threshold value processing for the second emphasis image data.

Since alignment films are rubbed, in rubbing treatment upon production of an LCD panel, in a fixed direction, rubbing stripes formed on the LCD panel have a characteristic in shape that a large number of stripes of the fixed direction are arranged at equal distances. Therefore, in the image data processing method and apparatus of the present invention, stripes of a very low contrast of a fixed direction arranged at equal distances such as rubbing stripes are selectively emphasized so that they can be detected. In particular, in the present invention, after shading is removed from an inputted original image data by digital image data processing to produce a difference image data, a filter (i.e., line segment emphasis filter) for emphasis of line segments of the fixed direction present in a gray-level image data (i.e., multiple-valued digital image data) is applied to the difference image data to obtain an image data (i.e., first emphasis image data) wherein the rubbing stripes are emphasized. Then, the threshold value processing is performed for the image data wherein the rubbing stripes are emphasized to obtain a binary image data. Since the first emphasis image data is a data where rubbing stripes of a very low contrast are emphasized, the rubbing stripes in the binary image data obtained by the threshold value processing are in most cases interrupted, and since the emphasis is very strong, also a large amount of noise is included in the binary image data. Therefore, in the present invention, line segment emphasis filtering is performed again for the binary image data and then threshold value processing is performed again to remove noises to selectively detect line segments of the rubbing stripes. The contents of the line segment emphasis filtering for the difference image data and the line segment emphasis filtering for the binary image data may be made different from each other by making the constructions of the filtering matrices different from each other or by some other suitable means. For example, the line segment emphasis filtering for the difference image data may be selected so as to emphasize line segments of two perpendicular directions while the line segment emphasis filtering for the binary image data is selected so as to emphasize line segments of only one of the two perpendicular directions mentioned above.

The above and other objects, features, and advantages of the present invention will become apparent from the following description based on the accompanying drawings which illustrate examples of preferred embodiments of the present invention.

DESCRIPTION OF THE PREFERRED EMBODIMENTS

First Embodiment

Figure 1:
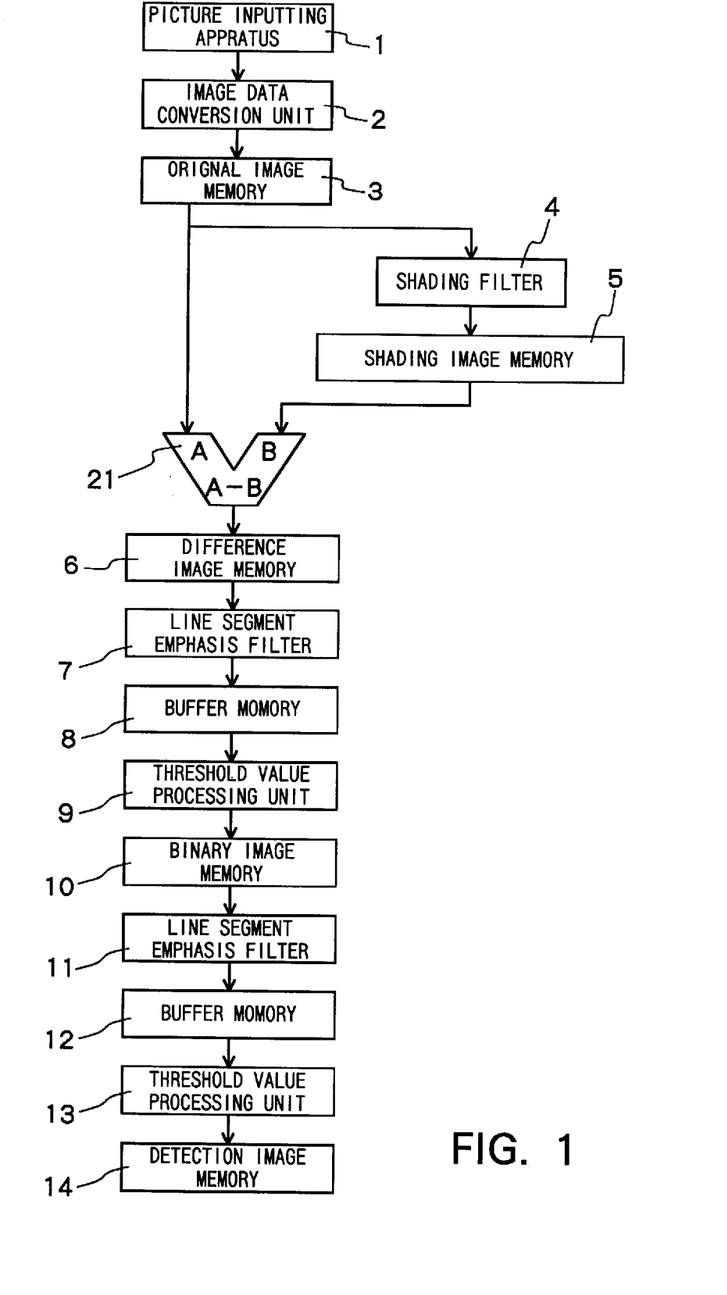
FIG. 1 is a block diagram showing a construction of an image data processing apparatus according to a first embodiment of the present invention.

An image data processing apparatus shown in FIG. 1 includes a picture inputting apparatus 1 formed from a CCD image sensor of a high resolution or a like device, an image data conversion unit 2 for converting an image signal outputted from the picture inputting apparatus 1 into an original image data in the form of a multiple-valued digital image data, an original image memory 3 for storing the original image data, a shading filter 4 for performing digital filtering for the original image data stored in the original image memory 3 to produce a shading image data, a shading image memory 5 for storing the shading image data produced by the shading filter 4, a subtractor 21 for subtracting the shading image data read out from the shading image memory 5 from the original image data read out from the original image memory 3 for each pixel to produce a difference image data, a difference image memory 6 for storing the difference image data, a first line segment emphasis filter 7 for performing first line segment emphasis filtering for the difference image data read out from the difference image memory 6 to produce a first emphasis image data, a first buffer memory 8 for temporarily storing the first emphasis image data, a first threshold value processing unit 9 for performing first threshold value processing for the first emphasis image data read out from the buffer memory 8 to produce a binary image data, a binary image memory 10 for storing the binary image data, a second line segment emphasis filter 11 for performing second line segment emphasis filtering for the binary image data read out from the binary image memory 10 to produce a second emphasis image data in the form of a multiple-valued digital image data, a second buffer memory 12 for storing the second emphasis image data, a second threshold value processing unit 13 for performing second threshold value processing for the second emphasis image data read out from the buffer memory 12 to produce a detection image data, and a detection image memory 14 for storing the detection image data.

The binary image data signifies an image data by which pixel values of the pixels are represented by "0" or "1". The subtractor 21 calculates a difference between pixel values for each pixel to produce a difference image data. The threshold value processing units 9 and 13 compare, for each pixel in the image data, a threshold value set in advance and the pixel value with each other to produce a binary image data which is "1" if the pixel value is equal to or higher than the threshold value, but is "0" if the pixel value has any other value.

In the present image data processing apparatus, the original image memory 3, shading image memory 5, difference image memory 6, buffer memories 8 and 12, binary image memory 10 and detection image memory 14 are each formed as an ordinary image memory and allow reading out of the stored image data when necessary. A common memory can be used for the buffer memories 8 and 12. Further, in the present embodiment, since the filtering processes and the threshold value processes are performed sequentially as hereinafter described, where an image data by any intermediate process before the final output image data is obtained is not required, all of the original image memory 3, shading image memory 5, difference image memory 6, buffer memories 8 and 12, binary image memory 10 and detection image memory 14 need not be provided independently of each other, but a general purpose memory area may be used commonly for those memories.

Next, a process of detecting rubbing stripes of an LCD panel using the image data processing apparatus is described.

Figure 2:
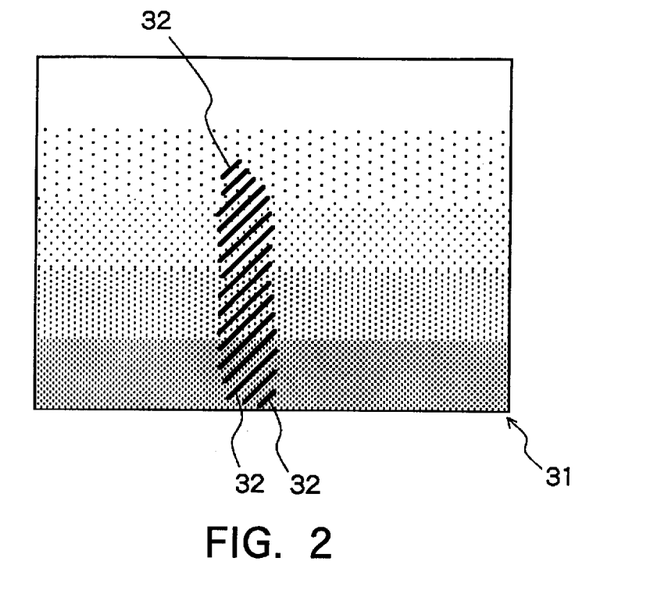
FIG. 2 is a schematic view showing rubbing stripes.

First, a picture which is uniformly white over the entire area thereof is displayed on an LCD panel of an object of inspection, and the LCD panel is imaged by the picture inputting apparatus 1. An image signal outputted from the picture inputting apparatus 1 is converted into an original image data by the image data conversion unit 2 and stored into the original image memory 3. The original image data is a multiple-valued digital image data, and later processing is performed by digital image data processing. FIG. 2 schematically shows rubbing stripes 32 appearing on an LCD panel 31, and it is assumed here that, as stripes which extend in a direction from the left lower corner to the upper right corner, that is, in the direction of +45 degrees, the rubbing stripes 32 appear at equal intervals. Here, for representation of angles, assuming an x-y rectangular coordinate system, an angle measured in the counterclockwise direction with respect to the positive direction of the x axis is used.

After the original image data is stored into the original image memory 3, smoothing filtering such as mean value filtering or median filtering is performed for the original image data read out from the original image memory 3 by means of the shading filter 4 to produce a shading image data. The shading image data is stored into the shading image memory 5. Then, the original image data read out from the original image memory 3 and the shading image data read out from the shading image memory 5 are inputted to the subtractor 21, by which a difference image data is produced. The difference image data is stored into the difference image memory 6. In the difference image data produced in this manner, the pixel values of pixels in a region in which the brightness is higher than the shading such as, for example, a region of a white defect, exhibit positive values, but the pixel values in another region in which the brightness is lower than the shading such as, for example, a region of a black defect, exhibit negative values.

Figure 3:
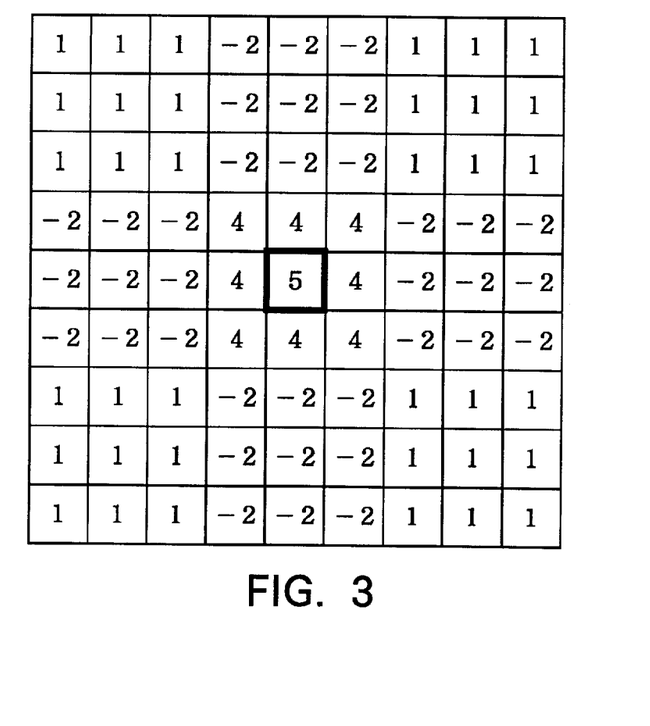
FIG. 3 is a diagrammatic view showing an example of filter coefficients for emphasis of line segments of directions of ±45 degrees.

Thereafter, first line segment emphasis filtering is performed for the difference image data read out from the difference image memory 6 by the line segment emphasis filter 7. In the first line segment emphasis filtering, for example, filtering processing represented by filter coefficients shown in FIG. 3 is performed to emphasize line segments of directions of ±45 degrees. The first emphasis image data obtained by the first line segment emphasis filtering is stored into the first buffer memory 8.

Figure 4A:
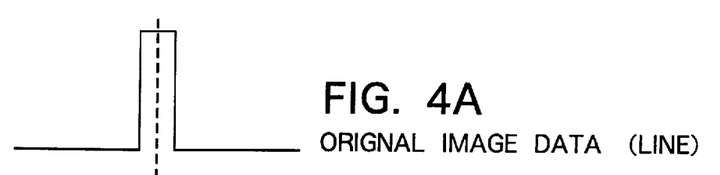
FIGS. 4A, 4B and 4C are diagrammatic views each illustrating unsharp masking.
Figure 4B:
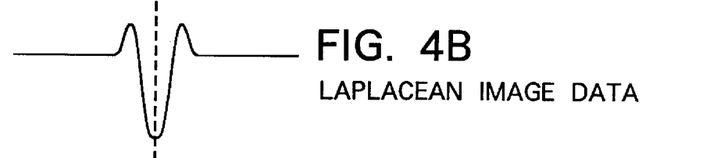
Figure 4C:
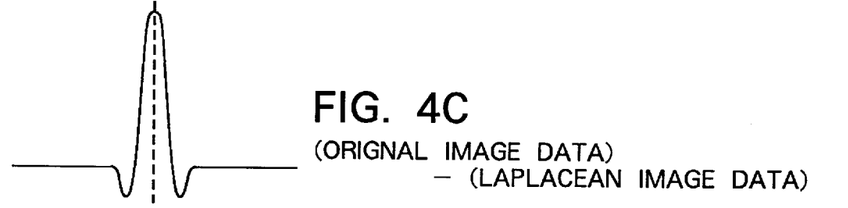

Here, the line segment emphasis filter is described. An operation of emphasizing an edge of a picture which is low in contrast and provides a dull feeling by filtering to make the picture clear-cut is generally called sharpening processing. Sharpening can be realized by emphasizing high frequency components in a spatial frequency distribution of the image data (i.e., picture). FIGS. 4A to 4C are views illustrating sharpening processing, and in FIGS. 4A to 4C, the axis of abscissa represents the pixel position and the axis of ordinate represents the pixel value. When a line is given as an original image data as shown in FIG. 4A, if a Laplacean filter which is a two-dimensional spatial differential linear filter is performed for the original image data, then a Laplacean image data having such a pixel value distribution as shown in FIG. 4B is obtained. Then, if the Laplacean image data shown in FIG. 4B is subtracted from the original image data shown in FIG. 4A, then since the pixel values at rising portions of the edge decrease while the pixel values at shoulder portions of the edge increase, the edge is emphasized as shown in FIG. 4C. The filtering processing wherein processing of generating a Laplacean image data and subtracting the Laplacean image data from the original image data is performed at a time is called unsharp masking.

Figure 5A:
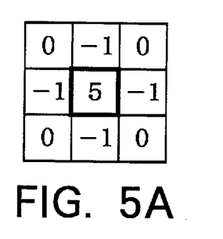
FIGS. 5A, 5B and 5C are diagrammatic views showing conventional examples of filter coefficients for the unsharp masking.
Figure 5B:
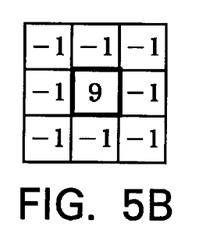
Figure 5C:
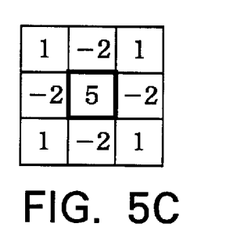

FIGS. 5A to 5C show examples of matrix coefficients of a 3×3 matrix used in ordinary unsharp masking. Here, the filter coefficient matrix is a representation of weighting coefficients for pixels in the proximity of an aimed pixel of an input image data with the aimed pixel corresponding to the element at the center of the matrix. In FIGS. 5A to 5C, a matrix element corresponding to an aimed pixel is indicated by a frame of a thick line. Then, the values of the pixels in the proximity including the aimed pixel are multiplied by the values of the respective corresponding elements and then a sum total of them is calculated, and the sum total thus calculated is determined as a pixel value of the aimed pixel in an output image data. For example, in filtering processing represented by the matrix shown in FIG. 5C, a sum of five times the pixel value of the aimed pixel, −2 times the pixel values of the four pixels upwardly, downwardly, leftwardly and rightwardly adjacent the aimed pixel and one time the pixel values of the four pixels obliquely adjacent the aimed pixel makes a pixel value of the aimed pixel in the output image data.

While the image data processing method of the present invention detects rubbing stripes using unsharp masking, since the contrast of rubbing stripes is very low, it is difficult to selectively detect rubbing stripes using such isotropic unsharp masking as seen in FIGS. 5A to 5C. Therefore, according to the present invention, unsharp masking by which selectivity for a fixed direction is enhanced so that stripes which extend in the fixed direction and are disposed at equal distances may be emphasized to emphasize also weak edges which extend in the direction, and the unsharp masking is employed as line segment emphasis filtering. The filter coefficients shown in FIG. 3 are represented by a comparatively large matrix of 9×9 and illustrate unsharp masking by which the selectivity in the directions of ±45degrees is enhanced. The filter coefficients shown in FIG. 3 have been experimentally found out as optimum filter coefficients by the present inventor. Here, the direction of −45 degrees signifies a direction perpendicular to the direction of +45 degrees mentioned above. Naturally, where the rubbing direction is not the direction of +45 degrees, also the filter coefficient matrix to be used for the line segment emphasis filtering must be varied accordingly.

After the first emphasis image data is produced in such a manner as described above, the first emphasis image data is read out from the buffer memory 8 and then is subject to first threshold value processing by the threshold value processing unit 9 to produce a binary image data. The threshold value T1 (>0) in this instance is a value for use for separation of rubbing stripes to be detected from noises and may be determined empirically. For each pixel, the pixel value in the first emphasis image data is compared with the threshold value T1, and when the pixel value of the first emphasis image data is equal to or higher than T1, the value of the corresponding pixel of the binary image data is determined to be "1", but when the pixel value of the first emphasis image data is lower than T1, the value of the corresponding pixel of the binary image data is determined to be "0". The binary image data produced in this manner is stored into the binary image memory 10.

By the way, by the first line segment emphasis filtering, while rubbing stripes are emphasized, also noises are emphasized. Therefore, in order to remove noises, second line segment filtering is performed for the binary image data.

Figure 6:
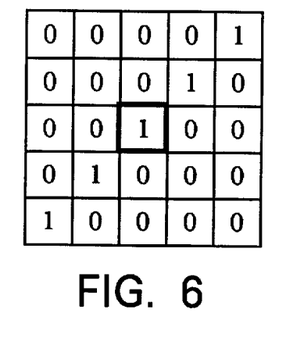
FIG. 6 is a diagrammatic view showing an example of filter coefficients for emphasis of line segments of a direction of +45 degrees.

In particular, second line segment emphasis filtering is performed for the binary image data read out from the binary image memory 10 by the line segment emphasis filter 11 to obtain a second emphasis image data. Here, for example, line segments of the direction of +45 degrees are emphasized using such filter coefficients as shown in FIG. 6. Then, the second emphasis image data obtained in this manner are stored into the second buffer memory 12.

Finally, second threshold value processing is performed for the second emphasis image data read out from the buffer memory 12 by the threshold value processing unit 13 to produce a detection image data in the form of a binary image date. The threshold value T2 (>0) here is a value for use for separation of rubbing stripes to be detected from noises and may be determined empirically. For each pixel, the pixel value of the second emphasis image data is compared with the threshold value T2, and when the pixel value of the second emphasis image data is equal to or higher than the second threshold value T2, the value of the corresponding pixel of the detection image data is determined to be "1", but when the pixel value of the second emphasis image data is lower then the second threshold value T2, the value of the corresponding pixel of the detection image data is determined to be "0". The detection image data thus produced is stored into the detection image memory 14, thereby ending the processing.

Second Embodiment

In the first embodiment described above, line segments of the direction of ±45 degrees are emphasized by the first line segment emphasis filtering by the first line segment emphasis filter 7, and line segments of the direction of the +45 degrees are emphasized by the second line segment emphasis filtering by the second line segment emphasis filter 11 to detect rubbing stripes of the direction of +45 degrees. However, some LCD panels are manufactured through rubbing treatment in two directions of, for example, +45 degrees and −45 degrees, and in order to detect rubbing stripes of an LCD panel of the type just mentioned, not only line segments extending in the direction of +45 degrees but also line segments extending in the direction of −45 degrees must be detected. An image data processing apparatus according to a second embodiment of the present invention shown in FIG. 7 is constructed so as to detect both of rubbing stripes in the two directions.

Figure 7:
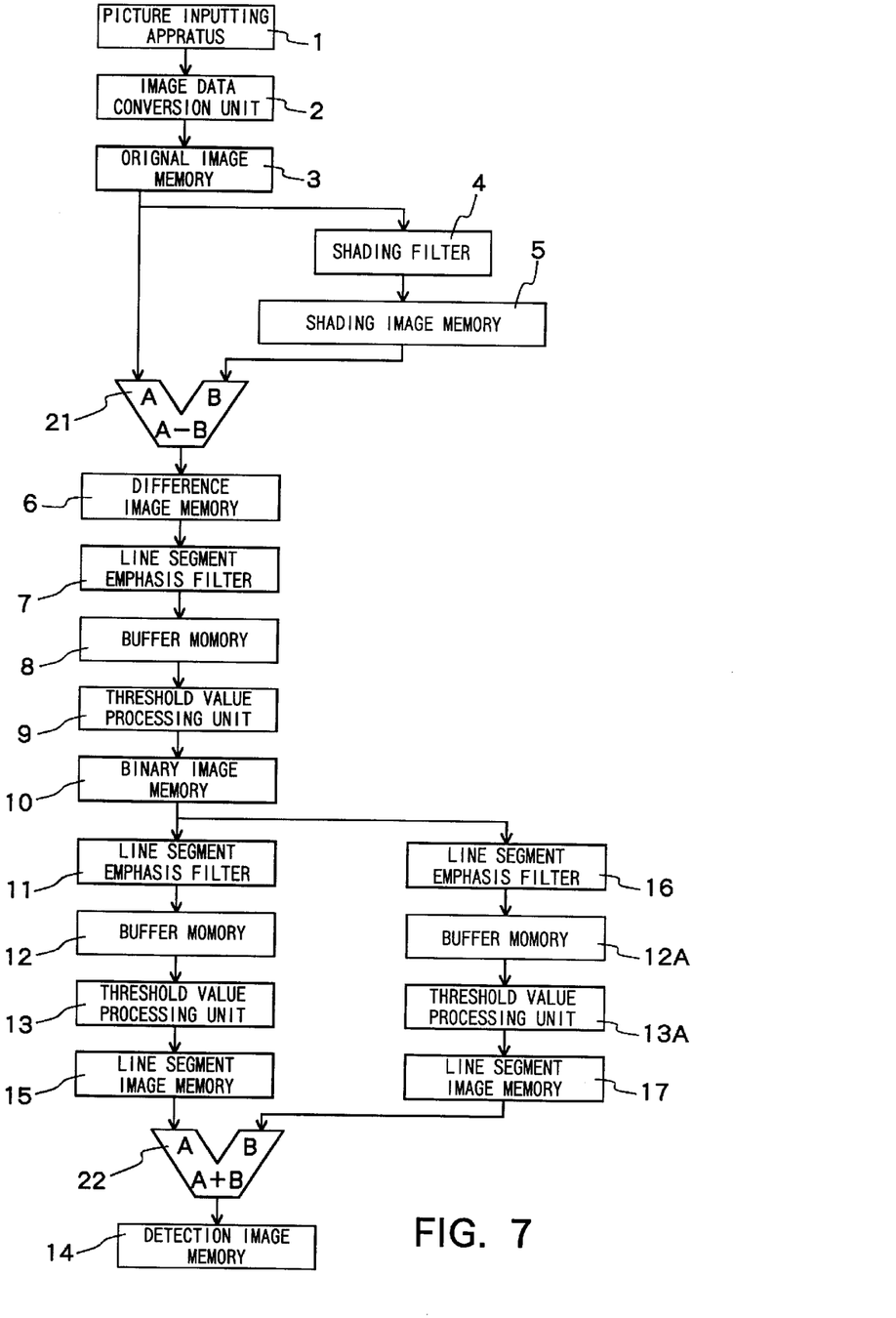
FIG. 7 is a block diagram showing a construction of an image data processing apparatus according to a second embodiment of the present invention.

The image data processing apparatus shown in FIG. 7 is a modification to and different from the image data processing apparatus of the first embodiment (refer to FIG. 1) in the following manner: In place of the detection image memory 14, a first line segment image memory 15 for storing an image data obtained by the second threshold value processing as a first line segment image data is disposed on the output side of the threshold value processing unit 13. The image data processing apparatus additionally includes a third line segment emphasis filter 16 for performing third line segment emphasis filtering for emphasis of line segments of the direction of, for example, −45 degrees for the binary image data read out from the binary image memory to produce a third emphasis image data, a third buffer memory 12A for storing the third emphasis image data, a third threshold value processing unit 13A for performing third threshold value processing for the third emphasis image data read out from the buffer memory 12A to produce a second line segment image data, a second line segment image memory 17 for storing the second line segment image data, and an adder 22 for adding the first line segment image data and the second line segment image data read out from the line segment image memories 15 and 17, respectively, for each pixel to produce a detection image data. The detection image memory 14 is disposed on the output side of the adder 22 and stores the detection image data obtained by the adder 22.

Figure 8:
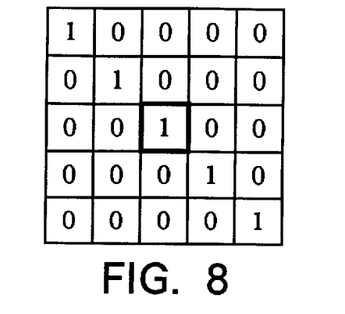
FIG. 8 is a diagrammatic view showing an example of filter coefficients for emphasis of line segments of a direction of −45 degrees.

The filter coefficients of the third line segment emphasis filter 16 are represented by such a filter coefficient matrix as shown in FIG. 8, and the threshold value of the third threshold value processing unit 13A is the same as the threshold value T2 of the second threshold value processing unit 13.

By the construction described, the line segment image memories 15 and 17 store the line segment image data wherein line segments of the directions of, for example, +45 degrees and -45 degrees are emphasized, respectively. By adding the two line segment image data by the adder 22, a detection image data wherein rubbing stripes of the two directions are emphasized can be obtained.

The present invention is not limited to the embodiments described above. In the present invention, some other process than those described above, for example, a noise removing process or a contrast emphasis process for the difference image data may be added.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. An image data processing method for performing image data processing for an input image data, characterized in that it comprises a first step of producing a first emphasis image data from the input image data by first line segment emphasis filtering processing for emphasis of line segments at least of a predetermined direction and producing a binary image data from the first emphasis image data by first threshold value processing; and a second step of producing a second emphasis image data from the binary image data by second line segment emphasis filtering processing for emphasis of line segments of the predetermined direction and extracting the line segments of the predetermined direction from the second emphasis image data by second threshold value processing, whereby the line segments of the predetermined direction arranged in a juxtaposed relationship from each other are selectively detected.

2. The image data processing method according to claim 1, wherein the input image data is a difference image data between an inputted original image data and a shading image data produced by filtering from the original image data.

3. The image data processing method according to claim 1, wherein the direction of line segments emphasized by the first line segment emphasis filtering is two perpendicular directions, and the direction of the line segments emphasized by the second line segment emphasis filtering is one of the two perpendicular directions.

4. The image data processing method according to claim 1, wherein the first line segment emphasis filtering is represented by a filter coefficient matrix of $$\begin{pmatrix} 1 & 1 & 1 & -2 & -2 & -2 & 1 & 1 & 1 \\ 1 & 1 & 1 & -2 & -2 & -2 & 1 & 1 & 1 \\ 1 & 1 & 1 & -2 & -2 & -2 & 1 & 1 & 1 \\ -2 & -2 & -2 & 4 & 4 & 4 & -2 & -2 & -2 \\ -2 & -2 & -2 & 4 & 5 & 4 & -2 & -2 & -2 \\ -2 & -2 & -2 & 4 & 4 & 4 & -2 & -2 & -2 \\ 1 & 1 & 1 & -2 & -2 & -2 & 1 & 1 & 1 \\ 1 & 1 & 1 & -2 & -2 & -2 & 1 & 1 & 1 \\ 1 & 1 & 1 & -2 & -2 & -2 & 1 & 1 & 1 \end{pmatrix}.$$

5. The image data processing method according to claim 2, wherein the direction of line segments emphasized by the first line segment emphasis filtering is two perpendicular directions, and the direction of the line segments emphasized by the second line segment emphasis filtering is one of the two perpendicular directions.

6. The image data processing method according to claim 2, wherein the first line segment emphasis filtering is represented by a filter coefficient matrix of $$\begin{pmatrix} 1 & 1 & 1 & -2 & -2 & -2 & 1 & 1 & 1 \\ 1 & 1 & 1 & -2 & -2 & -2 & 1 & 1 & 1 \\ 1 & 1 & 1 & -2 & -2 & -2 & 1 & 1 & 1 \\ -2 & -2 & -2 & 4 & 4 & 4 & -2 & -2 & -2 \\ -2 & -2 & -2 & 4 & 5 & 4 & -2 & -2 & -2 \\ -2 & -2 & -2 & 4 & 4 & 4 & -2 & -2 & -2 \\ 1 & 1 & 1 & -2 & -2 & -2 & 1 & 1 & 1 \\ 1 & 1 & 1 & -2 & -2 & -2 & 1 & 1 & 1 \\ 1 & 1 & 1 & -2 & -2 & -2 & 1 & 1 & 1 \end{pmatrix}.$$

7. An image data processing method for performing image data processing for an input image data, characterized in that it comprises a first step of producing a first emphasis image data from the input image data by first line segment emphasis filtering processing for emphasis of line segments of predetermined two directions and producing a binary image data from the first emphasis image data by first threshold value processing; and a second step of producing a second emphasis image data from the binary image data by second line segment emphasis filtering processing for emphasis of line segments of one of the predetermined two directions, producing a first line segment image data from the second emphasis image data by second threshold value processing, producing a third emphasis image data from the second emphasis image data by third line segment emphasis filtering processing for emphasis of line segments of the other one of the predetermined two directions, producing a second line segment image data from the third emphasis image data by third threshold value processing, and extracting the line segments of the predetermined two directions by adding the first line segment image data and the second line segment image data, whereby the line segments of the predetermined two directions arranged in a juxtaposed relationship from each other are selectively detected.

8. The image data processing method according to claim 7, wherein the input image data is a difference image data between an inputted original image data and a shading image data produced by filtering from the original image data.

9. The image data processing method according to claim 7, wherein the direction of line segments emphasized by the first line segment emphasis filtering is two perpendicular directions.

10. The image data processing method according to claim 7, wherein the first line segment emphasis filtering is represented by a filter coefficient matrix of $$\begin{pmatrix} 1 & 1 & 1 & -2 & -2 & -2 & 1 & 1 & 1 \\ 1 & 1 & 1 & -2 & -2 & -2 & 1 & 1 & 1 \\ 1 & 1 & 1 & -2 & -2 & -2 & 1 & 1 & 1 \\ -2 & -2 & -2 & 4 & 4 & 4 & -2 & -2 & -2 \\ -2 & -2 & -2 & 4 & 5 & 4 & -2 & -2 & -2 \\ -2 & -2 & -2 & 4 & 4 & 4 & -2 & -2 & -2 \\ 1 & 1 & 1 & -2 & -2 & -2 & 1 & 1 & 1 \\ 1 & 1 & 1 & -2 & -2 & -2 & 1 & 1 & 1 \\ 1 & 1 & 1 & -2 & -2 & -2 & 1 & 1 & 1 \end{pmatrix}.$$

11. An image data processing apparatus for performing image data processing for an inputted original image data, comprising:

an original image memory for holding the original image data;

a shading filter for performing filtering for the original image data to produce a shading image data;

a subtractor for producing a difference image data between the original image data and the shading image data;

a first line segment emphasis filter for performing filtering for emphasis of line segments at least of a predetermined direction for the difference image data to produce a first emphasis image data;

first threshold value processing means for performing threshold value processing for the first emphasis image data to produce a binary image data;

a second line segment emphasis filter for performing filtering processing for emphasis of line segments of the predetermined direction for the binary image data to produce a second emphasis image data; and second threshold value processing means for performing threshold value processing for the second emphasis image data.

12. An image data processing apparatus for performing image data processing for an inputted original image data, comprising:

an original image memory for holding the original image data;

a shading filter for performing filtering for the original image data to produce a shading image data;

a subtractor for producing a difference image data between the original image data and the shading image data;

a first line segment emphasis filter for performing filtering for emphasis of line segments of predetermined two directions for the difference image data to produce a first emphasis image data;

first threshold value processing means for performing threshold value processing for the first emphasis image data to produce a binary image data;

a second line segment emphasis filter for performing filtering processing for emphasis of line segments of one of the predetermined two directions for the binary image data to produce a second emphasis image data;

a third line segment emphasis filter for performing filtering processing for emphasis of line segments of the other one of the predetermined two directions for the binary image data to produce a third emphasis image data;

second threshold value processing means for performing threshold value processing for the second emphasis image data to produce a first line segment image data;

third threshold value processing means for performing threshold value processing for the third emphasis image data to produce a second line segment image data; and an adder for adding the first line segment image data and the second line segment image data.

* * * * *